(12) United States Patent
Waterhouse et al.

(10) Patent No.: US 9,093,694 B2
(45) Date of Patent: Jul. 28, 2015

(54) COMPOSITE BATTERY SEPARATOR

(75) Inventors: Robert R. Waterhouse, Scio, OR (US); Chi Thuong-Le La, Happy Valley, OR (US); Richard W. Pekala, Corvallis, OR (US)

(73) Assignee: Amtek Research International LLC, Lebanon, OR (US)

( * ) Notice: Subject to any disclaimer, the term of this patent is extended or adjusted under 35 U.S.C. 154(b) by 386 days.

(21) Appl. No.: 13/509,247

(22) PCT Filed: Nov. 9, 2010

(86) PCT No.: PCT/US2010/056055
§ 371 (c)(1),
(2), (4) Date: Jul. 3, 2012

(87) PCT Pub. No.: WO2011/059981
PCT Pub. Date: May 19, 2011

(65) Prior Publication Data
US 2012/0270110 A1 Oct. 25, 2012

Related U.S. Application Data

(60) Provisional application No. 61/260,306, filed on Nov. 11, 2009.

(51) Int. Cl.
*H01M 2/16* (2006.01)

(52) U.S. Cl.
CPC ............. *H01M 2/166* (2013.01); *H01M 2/164* (2013.01); *H01M 2/1613* (2013.01); *H01M 2/1646* (2013.01); *H01M 2/1653* (2013.01); *H01M 2/1666* (2013.01); *H01M 2300/0011* (2013.01)

(58) Field of Classification Search
CPC . H01M 2/166; H01M 2/1613; H01M 2/1666; H01M 2300/0011; H01M 2/164; H01M 2/1646; H01M 2/1653
USPC ........................................................ 429/248
See application file for complete search history.

(56) References Cited

U.S. PATENT DOCUMENTS

| | | |
|---|---|---|
| 3,026,366 A | 3/1962 | Comeau et al. |
| 5,979,530 A | 11/1999 | Moue |
| 6,242,127 B1 * | 6/2001 | Paik et al. ...................... 429/145 |
| 2003/0022068 A1 | 1/2003 | Pekala |
| 2003/0205835 A1 | 11/2003 | Eastin et al. |
| 2006/0281009 A1 | 12/2006 | Boyer et al. |
| 2008/0113259 A1 * | 5/2008 | Brilmyer et al. ................ 429/50 |
| 2012/0115008 A1 | 5/2012 | Sano et al. |

FOREIGN PATENT DOCUMENTS

WO 2011059981 A1 5/2011

* cited by examiner

*Primary Examiner* — Jane Rhee
(74) *Attorney, Agent, or Firm* — Stoel Rives LLP (57) ABSTRACT

A microporous silica-filled polyolefin separator (80) has a material composition that includes a fraction of cured rubber powder exhibiting low or no porosity. The cured rubber powder is a material derived from one or both of passenger and truck tires. The cured rubber powders exhibit the properties of increasing hydrogen evolution overpotential on the negative lead electrode and of decreasing the effect of antimony deposited on the negative electrode of the lead-acid battery. Incorporation of these cured rubber powders into the formulation of a microporous silica-filled polyethylene separator results in improved electrochemical properties in deep-cycle lead-acid batteries.

17 Claims, 8 Drawing Sheets

COMPOSITE BATTERY SEPARATOR

RELATED APPLICATION

This application claims benefit of U.S. Provisional Patent Application No. 61/260,306, filed Nov. 11, 2009.

COPYRIGHT NOTICE

© 2010 Amtek Research International LLC. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71 (d).

TECHNICAL FIELD

This disclosure relates to the use of particulate rubber filler in microporous separators for use in lead-acid batteries and, in particular, to batteries that are used in deep discharge cycle service.

BACKGROUND INFORMATION

The lead-acid storage battery is commonly found in two modes of design: the valve-regulated recombinant cell and the flooded cell. Both modes include positive and negative electrodes that are separated from each other by a porous battery separator. The porous separator prevents the electrodes from coming into physical contact and provides space for an electrolyte to reside. Such separators are formed of materials that are resistant to the sulfuric acid electrolyte and sufficiently porous to permit the electrolyte to reside in the pores of the separator material, thereby permitting ionic current flow with low resistance between adjacent positive and negative plates.

Separators for lead-acid storage batteries have been formed of different materials as the technology has developed. Sheets of wood, paper, rubber, PVC, fiberglass, and silica-filled polyethylene have all found use over time. A type of separator currently favored for use in flooded lead-acid storage batteries used in automotive starting-lighting-ignition (SLI) service is the silica-filled polyethylene separator. The microporous polyethylene matrix contains a large fraction of silica particles to provide wettability for the acid electrolyte and to help define the pore structure of the separator. A separator of this type is described in U.S. Pat. No. 7,211,322. In some flooded-battery designs, a nonwoven web, such as a glass mat, is attached to the ribs of the separator to contribute to holding in place the active material coated on the positive electrode.

Another application for flooded lead-acid storage batteries is the traction or deep-cycle battery, which commonly uses a separator comprised partly of rubber. Traditionally, this separator was a porous hard rubber, cross-linked with sulfur. Improvements on the rubber separator have included the addition of silica particulate filler to the rubber matrix before curing, and cross-linking with electron-beam radiation instead of chemical cross-linking agents.

All of these rubber-containing separators for deep-cycle batteries have the advantageous effects of promoting long cycle life by controlling water loss during charge. During the charging of the lead-acid storage battery, the active material on the negative electrode is first reduced from lead sulfate to lead. As the available active material is converted to lead, the potential of the electrode is lowered. As the potential on the negative electrode drops, an increasing fraction of the charging current is involved in the evolution of hydrogen by reduction of the hydronium ions present in the adjacent electrolyte. Meanwhile, at the positive electrode, the charging operation is oxidizing the active material from lead sulfate to lead oxide, accompanied by a rise in the potential of the positive electrode. As the potential rises, an increasing fraction of the charging current is involved in the production of oxygen by oxidation of adjacent water molecules and the production of hydronium ions to replace those consumed at the negative electrode. The net effect of the evolution of hydrogen at the negative electrode and the evolution of oxygen at the positive electrode is the consumption of water from the acid electrolyte. This loss of water results in an increase in the concentration of the sulfuric acid, an increase in the resistance of the battery, and eventual failure. By reducing the rate of water loss from the battery, rubber-containing separators result in extending the service life of deep-cycle batteries.

Conventional rubber-containing separators have several drawbacks. These separators have higher than desired resistance to ionic flow, are difficult and costly to produce, and are limited in supply. Thus, there have been several attempts to overcome these drawbacks. One such approach is described in U.S. Pat. No. 5,154,988 and uses a coating of natural rubber latex applied to one or both sides of the separator sheet. The coating may be achieved by any of a number of common coating methods including spraying, dip coating, roll coating, draw rod coating, and gravure coating. After application of the latex, or a dispersion of latex in a suitable carrier liquid, the separator is thoroughly dried. One major drawback of this approach is that the spraying and drying steps add cost to the separator and, therefore, cannot be performed economically. Another major drawback is that the natural rubber coating will cover at least a fraction of the pores on the surface of the separator and result in higher resistance to ion flow through the separator and in reduced performance of the lead-acid storage battery.

Another approach is described in U.S. Pat. No. 6,242,127 and overcomes some of the drawbacks of the above-described coated separator by adding to a silica-filled polyethylene separator of a type commonly used for lead-acid storage batteries in SLI service, a quantity of powder obtained by pulverizing a cured silica-filled rubber separator of the traditional type. This approach combines the benefits of the silica-filled polyethylene separator, such as low resistance to ion flow and lower cost, with those of the rubber-based separator, such as a reduction in water loss and longer cycle life in lead-acid storage batteries in deep-cycle service. An obvious drawback to this approach is that it relies on the destruction of rubber-based separator material to make the powder used in the modified formulation of the silica-filled polyethylene separator. Such material, if made from waste or rejected silica-filled rubber separator, is likely to be in short supply or, if made from silica-filled rubber separator produced expressly for pulverization, prohibitively expensive. Another drawback of this approach is that the porous filler contains on a volume basis in the finished separator little of the active ingredient that contributes to the beneficial electrical performance of the battery. Moreover, the porous nature of the filler particle results in rapid diffusion of the active ingredient out of the particle, thereby reducing its long term effectiveness in the battery.

Despite the advances made in the art with respect to improved separators containing some form of rubber, there continues to be a need for a low-cost, low-resistance separator that also limits the water loss and improves the cycle life of lead-acid storage batteries used in deep-cycle service over long application times of several years.

SUMMARY OF THE DISCLOSURE

The disclosed microporous silica-filled polyolefin separator has a material composition that includes a fraction of cured rubber powder exhibiting low or no porosity. This cured rubber powder fraction may also contain one or both of silica and carbon black, in addition to the cured rubber component. The cured rubber powder may be obtained from a number of sources, and a preferred powder is available from Edge Rubber, Chambersburg, Pa. This cured rubber powder is a material derived from one or both of passenger and truck tires. The mass ratio of cured rubber powder to the polyethylene in the separator can vary from about 0.01 to about 1.0.

The cured rubber powders used in the disclosed polyolefin separator exhibit the properties of increasing the hydrogen evolution overpotential on the negative lead electrode and of decreasing the effect of antimony deposited on the negative electrode of the lead-acid battery. Incorporation of these cured rubber powders into the formulation of a microporous silica-filled polyethylene separator results in improved electrochemical properties in deep-cycle lead-acid batteries.

The other principal components of this separator formulation are an ultrahigh molecular weight polyethylene that provides the strength and mechanical integrity of the separator, precipitated silica that provides wettability so that the sulfuric acid electrolyte may easily wick through the pores, carbon black colorant that imparts a consistent appearance to the separator surface, and residual plasticizer that provides some protection against oxidation.

Additional aspects and advantages will be apparent from the following detailed description of preferred embodiments, which proceeds with reference to the accompanying drawings.

DETAILED DESCRIPTION OF PREFERRED EMBODIMENTS

Preferred embodiments include the addition of a cured rubber powder having low porosity to the composition of a silica-filled polyethylene separator. A preferred cured rubber −200 mesh powder available from Edge Rubber. The preferred cured rubber powder has the advantage that it may be readily obtained in large quantities from base material derived from passenger and truck tires.

A feature of preferred cured rubber powders is that they have little or no porosity within the particle. Applicants have discovered that the nonporous nature of the powder particles contributes to an improved electrochemical characteristic of the separator by increasing the quantity of active ingredient per unit volume of the particle and by slowing the diffusion of the active ingredient out of the particle through a controlled release mechanism into the surrounding sulfuric acid electrolyte.

The exact nature of the active ingredient in the cured rubber particle is not known, but it is widely thought to be a chemical compound that is leached from the cured rubber by the sulfuric acid electrolyte and it becomes effective elsewhere in the battery, most likely on the surface of the negative lead electrode. Thus, it can be appreciated that, for a given particle size of a cured rubber powder, there may be a greater quantity of the active ingredient in a particle that is nonporous compared to a particle that has within it a pore volume amounting to 40% or more of the total particle volume.

Figure 1A:
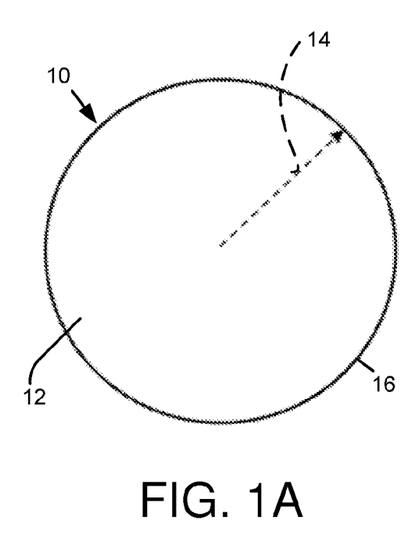
FIGS. 1A and 1B are schematic diagrams presenting a comparison of, respectively, a preferred nonporous cured rubber particle and a porous cured rubber particle.

Another benefit of the nonporous cured rubber particle is that the rate of diffusion of the active ingredient out of the particle is slowed because of the lower surface area that is in contact with the electrolyte and the greater average diffusion path length for a molecule of the active ingredient to reach this surface. This effect can be explained by reference to FIGS. 1A and 1B. FIG. 1A shows a nonporous spherical particle 10 comprising a cured rubber matrix 12 with a uniform but unknown concentration of the active ingredient. For the active ingredient molecules to enter the electrolyte that surrounds particle 10, they diffuse along a diffusion path 14 to an exterior surface 16. It is generally understood that the rate of diffusion through the rubber matrix is much slower than the rate of diffusion in the surrounding electrolyte. Initially, the length of diffusion path 14 is very small for the active ingredient molecules that are adjacent to exterior surface 16 of particle 10. As depletion of the active ingredient progresses, the diffusion path length increases and the concentration gradient of the active ingredient from inside particle 10 to exterior surface 16 relaxes. Thus, the rate of depletion of the active ingredient changes with time. A mathematical description of this depletion process is based on Fick's second law of diffusion and in spherical coordinates takes the form of $$\partial C/\partial t = D(1/r^2)\partial/\partial r(r^2 \partial C/\partial r), \text{where:}$$

C=the concentration of the active ingredient at time, t, and radial distance, r;
D=the diffusion constant for the active ingredient in the cured rubber particle;
r=the radial coordinate from the center of the particle; and
t=time.

An approximate solution to this equation, using a series approach and ignoring all but the first term gives $C(t)=C_0 \times [1-2R/\pi \exp(-t/\theta_{SP})\sin(\pi r/R)/r]$, where $\theta_{SP}=R^2/(\pi^2 D)$, is the characteristic time for diffusion of the active ingredient from within the spherical particle based on the radius of the sphere, R. The characteristic time for diffusion is proportional to the square of the radius, R, of the sphere, meaning that the time required to accomplish a degree of depletion of the active ingredient increases as the square of an increase in the radius of the particle.

Figure 1B:
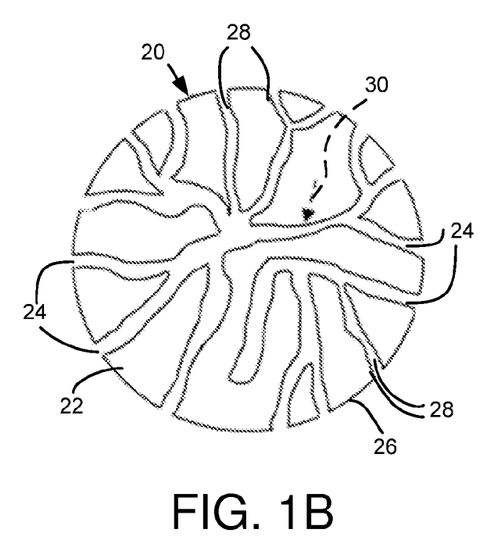

FIG. 1B shows, in contrast to nonporous particle 10 discussed above, a porous particle 20 comprising a cured rubber matrix 22 containing silica and a uniform concentration of active ingredient. Pores 24 extend throughout particle 20 and are filled with the sulfuric acid electrolyte also surrounding the outside of particle 20. The surface area of contact between cured rubber matrix 22 and the electrolyte is the sum of the area of an exterior surface 26 of particle 20 and the area of interior surfaces 28 created by pores 24. The total surface area of a porous particle 20 can be many times greater than that of a nonporous particle 10 of the same size. Another consequence of the internal porosity of porous particle 20 is that the average length of a diffusion path 30 of the active ingredient from cured rubber matrix 22 to the electrolyte is much shorter than diffusion path 14 for nonporous particle 10 of the same size. The combination of these two factors, increased surface area and shorter diffusion path length, results in a much higher rate of depletion of the active ingredient from porous cured rubber particle 20 than from nonporous cured rubber particle 10. A higher rate of depletion is not desired, which is why nonporous particle 10 is preferred.

Ultrahigh molecular weight polyethylene (UHMWPE) having an intrinsic viscosity of at least 10 deciliters/gram is preferred to form the polyolefin web. A viscosity range of about 14-18 deciliters/gram is desirable for preferred embodiments of the separator. Although there is no preferred upper limit for the intrinsic viscosity, current commercially available UHMWPEs have an upper intrinsic viscosity limit of about 29 deciliters/gram. The UHMWPE matrix has sufficient porosity to allow liquid electrolyte to rapidly wick through it.

A preferred process oil used during extrusion of the separator web is one in which UHMWPE dissolves and is a nonevaporative liquid solvent at room temperature. While any extrusion process oil may be used, exemplary process oils include paraffinic oil, naphthenic oil, aromatic oil, or a mixture of two or more such oils. Examples of commercially available process oils include oils sold by Shell Oil Company (such as Gravex™ 41 and Catnex™ 945), oils sold by Chevron Oil Company (such as Chevron 500R), oils sold by Calumet Lubricants Co. (such as Hydrocal™ 800) and oils sold by Lyondell Oil Company (such as Tufflo™ 6056). A processed separator typically contains between about 12% weight to about 18% weight residual process oil.

Any solvent for extracting the process oil from the separator web may be used in the extraction process. Preferably, the solvent has a boiling point that makes it practical to separate the solvent from the plasticizer. Exemplary solvents include trichloroethylene, perchloroethylene, 1,2-dichloroethane, 1,1,1-trichloroethane, 1,1,2-trichloroethane, methylene chloride, chloroform, 1,1,2-trichloro-1,2,2-trifluoroethane, isopropyl alcohol, diethyl ether, acetone, hexane, heptane, and toluene.

Exemplary minor ingredients incorporated into the UHMWPE web include antioxidants, colorants, pigments, residual plasticizer or process oil, waxes, lubricants, other polymers, and processing aids.

A useful test for determining the ability of a particular rubber powder of counteracting the effect of antimony on the negative electrode of a lead-acid battery is the Antimony Suppression Test. This test was described by Werner Boehnstedt of W.R. Grace in 1987 and uses Linear Scanning Voltammetry (LSV) to examine the hydrogen-evolving behavior of the negative lead electrode in the presence of antimony and a candidate antimony control additive (ACA). The antimony control additive is generally a leachate prepared from a material such as a natural rubber. The leachate is prepared by placing a quantity (1-10 grams) of the effective active ingredient-containing material in a volumetric flask along with 100 ml of clean, pre-electrolyzed sulfuric acid with a specific gravity of 1.210. The flask is lightly sealed with a stopper and placed in an oven at 70° C. for 96 hours, after which the leatchate is ready to be used.

Figure 2:
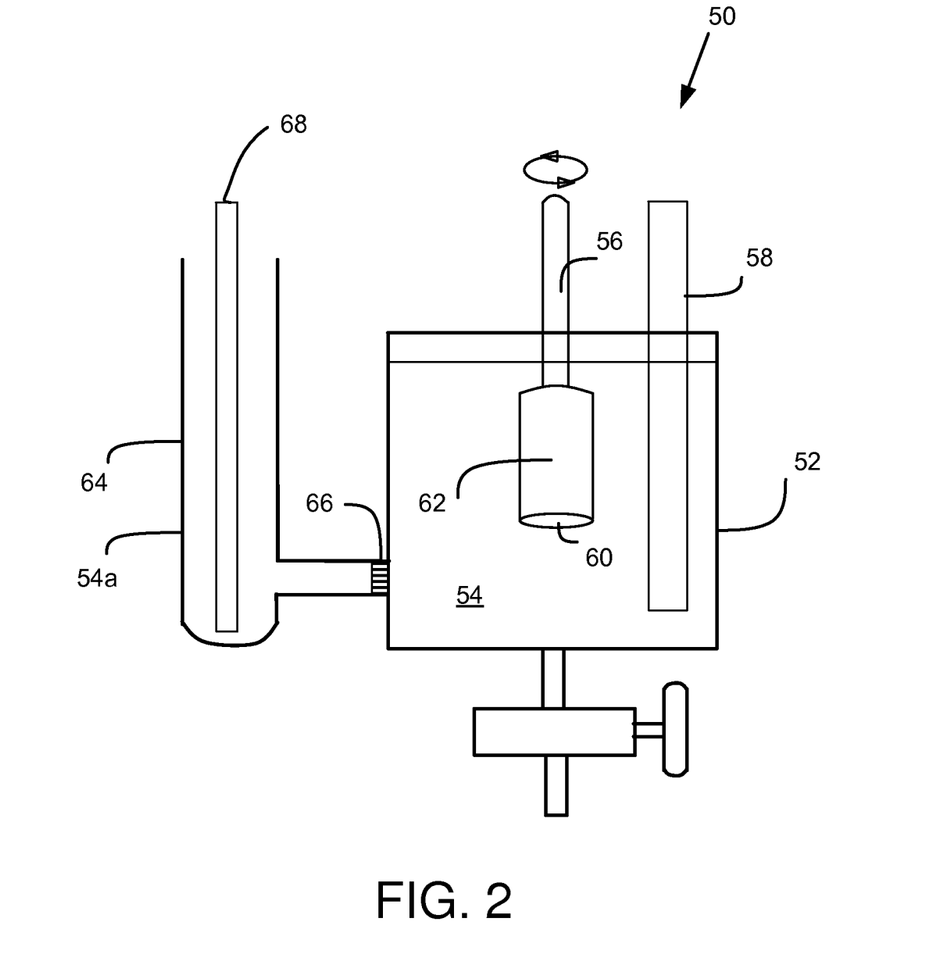
FIG. 2 is a schematic diagram of an apparatus for measuring the effect on hydrogen evolution and antimony suppression on a negative lead electrode.

The Antimony Suppression Test is performed using a three-electrode cell apparatus 50 shown schematically in FIG. 2. Cell apparatus 50 comprises a glass vessel 52 filled with clean, pre-electrolyzed sulfuric acid 54. A working electrode 56 and a reference electrode 58 are inserted into vessel 52 and extend into acid 54. Working electrode 56 is composed of a polished disk 60 of pure (+99.99%) lead inserted in the end of an insulating cylinder 62, along the length of which an electrical connection runs through the center. Working electrode 56 is rotated to produce in vessel 52 a vortex that creates reproducible circulation of the electrolyte past the surface of working electrode 56. Reference electrode 58 contains mercury and mercurous sulfate ($Hg/HgSO_4$) with a saturated potassium sulfate electrolyte and has a highly stable and reproducible potential of 0.658 V on the hydrogen scale at 22° C. During the electrochemical compatibility (ECC) test, the voltage of working electrode 56 is controlled relative to this reference using a potentiostat. Reference electrode 58 does not otherwise participate in the electrochemical circuit. A side arm 64 is connected to glass vessel 52 by a fritted glass element 66. Side arm 64 is filled with the same sulfuric acid electrolyte 54a, in which a counter electrode 68 is immersed. Counter electrode 68 is a rod of pure lead and participates in the electrochemical circuit with working electrode 56 via fritted glass element 66.

Figure 3:
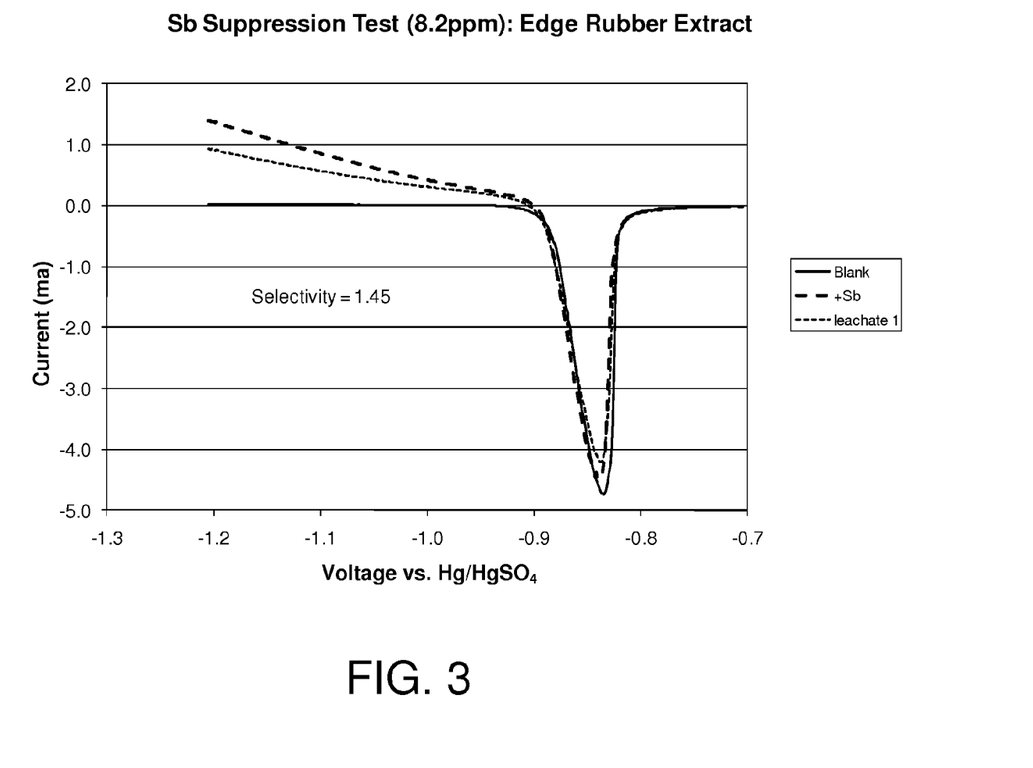
FIG. 3 is a diagram of the results of an antimony suppression test showing the effect of the preferred rubber powders.

The procedure for the Antimony Suppression Test began with three cathodic cycles between −700 mV and −1700 mV to condition working electrode 56 at a sweep rate of 3.33 my per second after which a blank linear scanning voltammetry (LSV) scan was run. For the LSV scan, working electrode 56 was held at a fixed potential of −1200 mV for 15 minutes, then swept from −1200 mV to −700 mV at 5 mV/sec. Following the blank scan, 1.0 ml of 0.1% $Sb^{3+}$ ion in $HNO_3$ acidified solution (1.010 g/ml) was added to the electrolyte, resulting in a concentration of 8.2 ppm, and the LSV scan was repeated. Finally, a quantity (5-10 ml) of the leachate was added, and a final LSV scan was run. The results of the three scans are plotted as shown in FIG. 3. A selectivity ratio is calculated by comparing the change in current at −1200 my between the second and third scans to the change in discharge capacity between the second and third scans according to the following formula: Selectivity Ratio=(Iscan2/Iscan3)/(Qscan2/Qscan3). Values of this ratio greater than 1.00 correspond to the desired suppression effect. Values greater than 1.10 are preferred, and values greater than 1.3 are more preferred.

EXAMPLE 1

A leachate was prepared as described above using 5.0 grams of −200 mesh rubber powder, manufactured by Edge Rubber, Chambersburg, Pa., combined with 100 ml of pre-electrolyzed sulfuric acid with a specific gravity of 1.210. An Antimony Suppression Test was conducted as described above using 10 ml of the prepared leachate, and a Selectivity Ratio of 1.45 was calculated.

EXAMPLES 2 and 3

Leachates were prepared as in Example 1 for rubber powder type Microdyne 75, manufactured by Lehigh Technologies, Tucker, Ga., and type Ecorr RNM 45, manufactured by Rubber Resources BV, Lommel, Belgium. Antimony Suppression Tests were run on these leachates, and selectivity ratios of 1.15 and 1.38 were calculated, respectively, for the two rubber powders, as shown in table 1 below.

COMPARATIVE EXAMPLE 1

A sheet of natural rubber and silica was prepared by mixing two parts natural rubber latex (Hartex type 101, manufactured by Hartex Rubber Private Limited, Andhra, India) with one part silica (PPG type WB37, manufactured by PPG Industries, Inc., Pittsburgh, Pa.) and drying the mixture in a glass pan. A leachate of this material was prepared with 8.07 grams of the sheet cut into pieces that fit in a 250 ml flask, adding 100 ml of pre-electrolyzed sulfuric acid (1.210 SG), and heating the mixture in a convection oven at 70° C. for six days. An Antimony Suppression Test was conducted as described above using 10 ml of the prepared leachate, and a Selectivity Ratio of 1.00 was calculated as shown in Table 1.

TABLE 1

| Example No. | Material | Selectivity Ratio |
|---|---|---|
| Example 1 | Edge Rubber | 1.45 |
| Example 2 | Microdyne 75 | 1.15 |
| Example 3 | Ecorr RNM 45 | 1.38 |
| Comparative Example 1 | Natural Rubber and silica | 1.00 |

COMPARATIVE EXAMPLE 2

UHMWPE (type GUR 4150, manufactured by Ticona, LLC, Florence, Ky.) was combined with precipitated silica (type WB-37) to form separator material having a silica-to-polyethylene weight ratio of 2.3:1. The above combination was mixed with carbon black concentrate (0.8% weight), antioxidant (0.1% weight), lubricant (0.1% weight), recycled silica-filled separator pellets (6.9% weight), and process oil (56.6% weight) in a batch mixer. This mixture was fed to a counter-rotating twin screw extruder operating at a melt temperature of approximately 215° C. Additional process oil was added in-line to bring the final extrudate oil content to approximately 65% weight. The resulting melt was passed through a sheet die into a calender (comprising a grooved profile roll and a crown roll), in which the calender gap was used to control the extrudate thickness. The oil-filled sheet was subsequently extracted with trichloroethylene and dried to form the final separator, which contained approximately 15% weight residual oil and exhibited a desired backweb thickness of 0.15 mm.

EXAMPLES ACCORDING TO THE DISCLOSURE

The manufacture of a rubber-modified silica-filled separator is as follows: 10% weight of UHMWPE in the standard silica-filled separator mixture, as described previously, was replaced by ground rubber (Edge Rubber type-200 mesh). The resulting mixture was thoroughly mixed in the batch mixer and was subsequently fed to the counter-rotating twin screw extruder. Using the same extrusion process for the manufacture of the standard silica-filled separator, a rubber-modified silica-filled separator, which had approximately 15% weight residual oil and 0.15 mm backweb thickness, was produced. Additionally, three more rubber modified silica-filled separators that contained different concentrations of ground rubber were manufactured using the same extrusion process. Table 2 below describes the four rubber modified silica-filled separators (designated as "rubber-modified separators"), together with the standard silica-filled separator (designated as "control").

TABLE 2

Description of the four rubber-modified silica-filled separators and the standard silica-filled separator manufactured in Example 1.

| Separator sample designation | Ground rubber incorporation | Rubber powder particles to polyethylene mass ratio |
|---|---|---|
| Standard silica-filled separator (control) | None | 0.0 |
| Rubber-modified silica-filled separator #1 | Replacing 10% weight UHMWPE in standard silica-filled mixture with ground rubber | 0.11 |
| Rubber-modified silica-filled separator #2 | Replacing 20% weight UHMWPE in standard silica-filled mixture with ground rubber | 0.25 |
| Rubber-modified silica-filled separator #3 | Adding ground rubber, which equals to 10% weight UHMWPE, to the standard silica-filled mixture | 0.10 |
| Rubber-modified silica-filled separator #4 | Adding ground rubber, which equals to 20% weight UHMWPE, to the standard silica-filled mixture | 0.20 |

The ECC test is useful for characterizing the beneficial electrochemical effects of a separator for deep-cycle batteries by examining the hydrogen evolution behavior of the negative electrode. This test was developed by Bell Laboratories for screening materials used in batteries for power backup for telephones. A detailed description of the test can be found in the BCI Battery Technical Manual, BCIS-03A, rev. February 2, published by the Battery Council International. This test can be performed using the same test cell shown in FIG. 2 and on leachate samples prepared as previously described for the Antimony Suppression Test.

Figure 4:
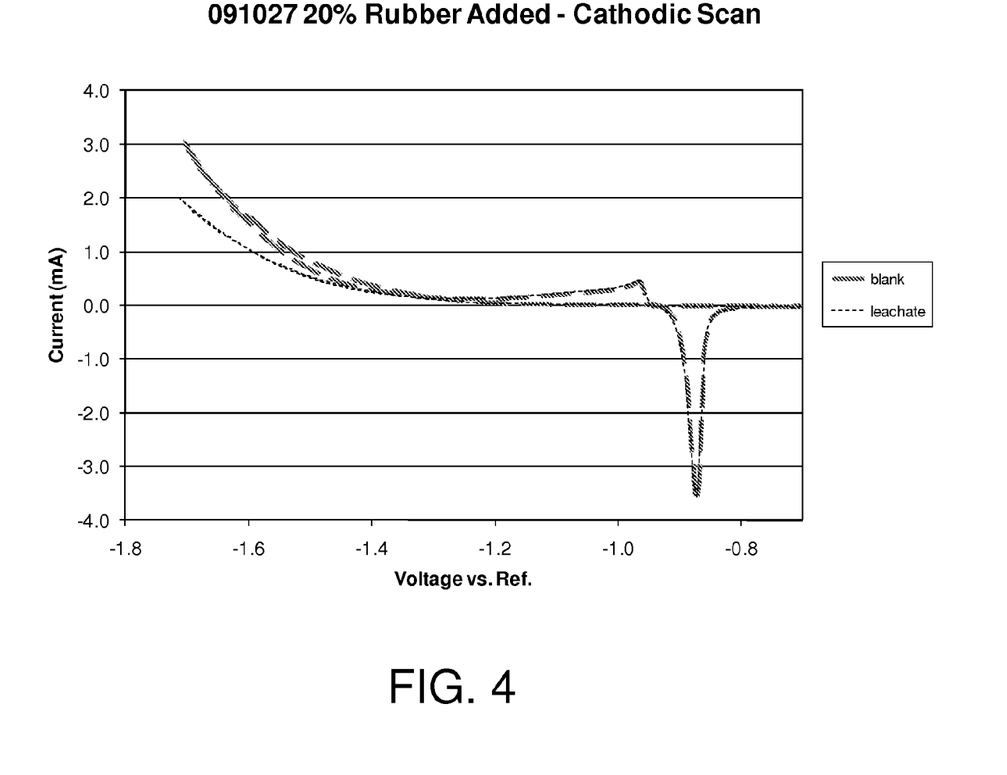
FIG. 4 is a diagram of a typical electrochemical compatibility (ECC) plot showing the suppression of hydrogen evolution.

The procedure (simplified for brevity) for practicing the ECC test is as follows. First, a blank cathodic (negative) scan with clean acid is run. With working electrode 56 rotating at 1000 rpm and using the potentiostat, the potential of working electrode 56 is swept from −0.700 V to −1.700 V vs. reference electrode 58 at a constant sweep rate of 3.33 mV/sec. This is repeated three times to condition working electrode 56, then a fourth, blank scan is run to a maximum potential of 1.700 V to 1.800 V, depending on the hydrogen evolution current achieved. During the voltage sweep, the current flowing through working electrode 56 is measured, giving a current-voltage curve as shown in FIG. 4. Next, 10 ml of the leachate are added to cell apparatus 50, and a cathodic leachate scan is run using the same conditions as those used for the blank scan. During this scan the current is recorded as a function of voltage, giving the current-voltage curve shown in FIG. 4. Analyzing the results of this test entails comparing the blank and the leachate curves and identifying and quantifying any changes in the voltage and current in the charge peak, hydrogen evolution voltage, and the discharge peak. In their testing, applicants focused on the hydrogen evolution behavior at working electrode 56. A significant shift in hydrogen evolution potential is observed in FIG. 4. At a current level of 1 ma (current density of 5 ma/cm$^2$) the electrode potential is shifted −49 mv from the blank to the leachate scan. At a current level of 2 ma (10 ma/cm$^2$), the shift in potential between the blank and the leachate scans is increased to 74 mv. These negative shifts in electrode potential are an indication of the increase in the electrochemical overpotential for hydrogen evolution leading to the suppression of hydrogen evolution and water loss by the rubber-modified separator when used in a lead-acid battery in deep-cycle service.

Sample sheets from the control separator and the rubber-modified separators were measured for boiled electrical resistance. The sheets were first boiled in de-ionized water for 10 minutes, followed by soaking in $H_2SO_4$, 1.28 SG, at room temperature for 20 minutes. The electrical resistance measurement was performed, one sheet at a time, on a Palico 9100-2 Low Resistance Measurement System with a sealed $H_2SO_4$ bath. The results are summarized in Table 3 below. As the UHMWPE in the control formula is replaced with rubber, the volume fraction of silica, which is responsible for water/$H_2SO_4$ uptake in the separator, increases. As a result, the separator electrical resistance decreases. On the other hand, when rubber is added to the control formula, the volume fraction of silica is reduced, leading to an increase in the separator electrical resistance.

TABLE 3

The boiled electrical resistance of the control and rubber-modified separators.

| Separator sample | Boiled electrical resistance (m$\Omega$-cm$^2$) |
| --- | --- |
| Control | 62 |
| Rubber-modified separator 1 | 60 |
| Rubber-modified separator 2 | 58 |
| Rubber-modified separator 3 | 66 |
| Rubber-modified separator 4 | 78 |

Figure 5:
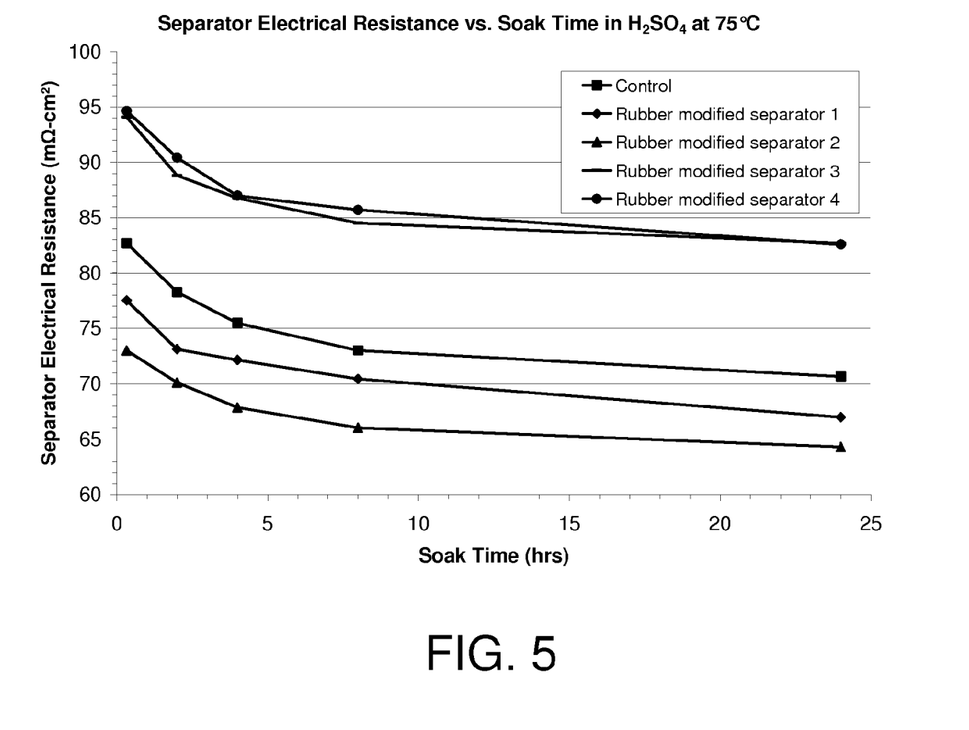
FIG. 5 is a graph comparing electrical resistance of a control separator with electrical resistances of four rubber-modified separators.

The graph in FIG. 5 compares the 75° C. soaked electrical resistance of the control separator to that of each of the four rubber-modified separators. In this test, the sample sheets were soaked in $H_2SO_4$, 1.28 SG, which was maintained at 75° C. in a water bath. The samples were measured for their electrical resistances after 20 minutes, 2 hours, 4 hours, 8 hours, and 24 hours of soaking, using the Palico 9100-2 Low Resistance Measurement System. Similar to the boiled separator electrical resistance, the 75° C. soaked separator electrical resistance is smaller when the UHMWPE in the control formula is replaced by the rubber and is higher when the rubber is added to the control formula.

The puncture resistance in the backweb and shoulder regions of the control separator and the puncture resistances of the rubber modified separators were measured on an Instron 4301 instrument using a 2.0 mm diameter puncture pin traveling at a speed of 508 mm/minute. The puncture resistance results are summarized in Table 4 below. As the rubber is incorporated into the standard silica-filled separator formula, the volume fraction of UHMWPE, which has excellent mechanical properties, is reduced, as indicated in Table 4. Therefore, the puncture resistance of the rubber-modified separators is smaller than that of the control separator. This is shown in the normalized backweb puncture resistance, which was obtained by dividing the puncture resistance in the backweb by the thickness of the backweb.

TABLE 4

Separator puncture resistance properties

| Separator | Puncture resistance, backweb (N) | Normalized puncture resistance, backweb (N/mm) | Puncture resistance, shoulder (N) |
| --- | --- | --- | --- |
| Control | 7.8 | 46.7 | 8.8 |
| Rubber-modified separator 1 | 6.7 | 40.7 | 8.3 |
| Rubber-modified separator 2 | 5.4 | 33.9 | 7.1 |
| Rubber-modified separator 3 | 7.5 | 44.0 | 9.1 |
| Rubber-modified separator 4 | 7.7 | 46.8 | 9.2 |

Figure 6:
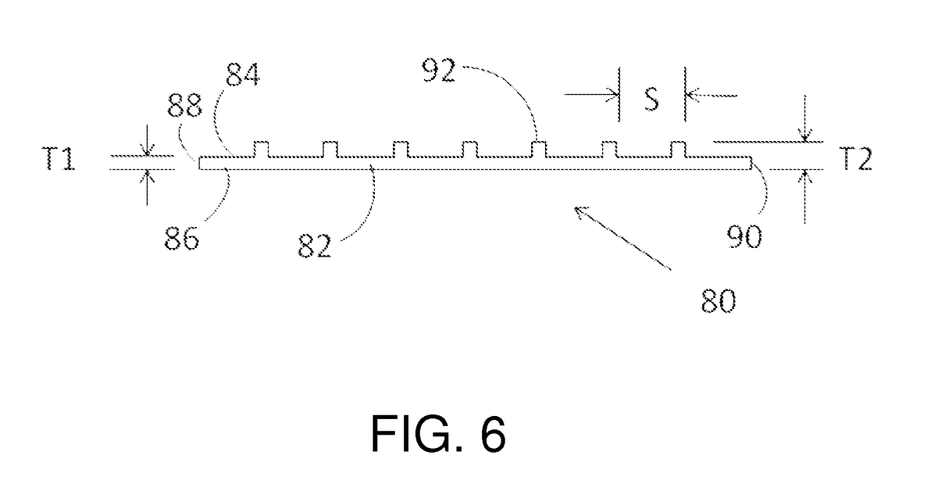
FIGS. 6 and 7 are, respectively, side elevation and top plan views of one embodiment of the disclosed porous separator for use in a lead-acid storage battery.
Figure 7:
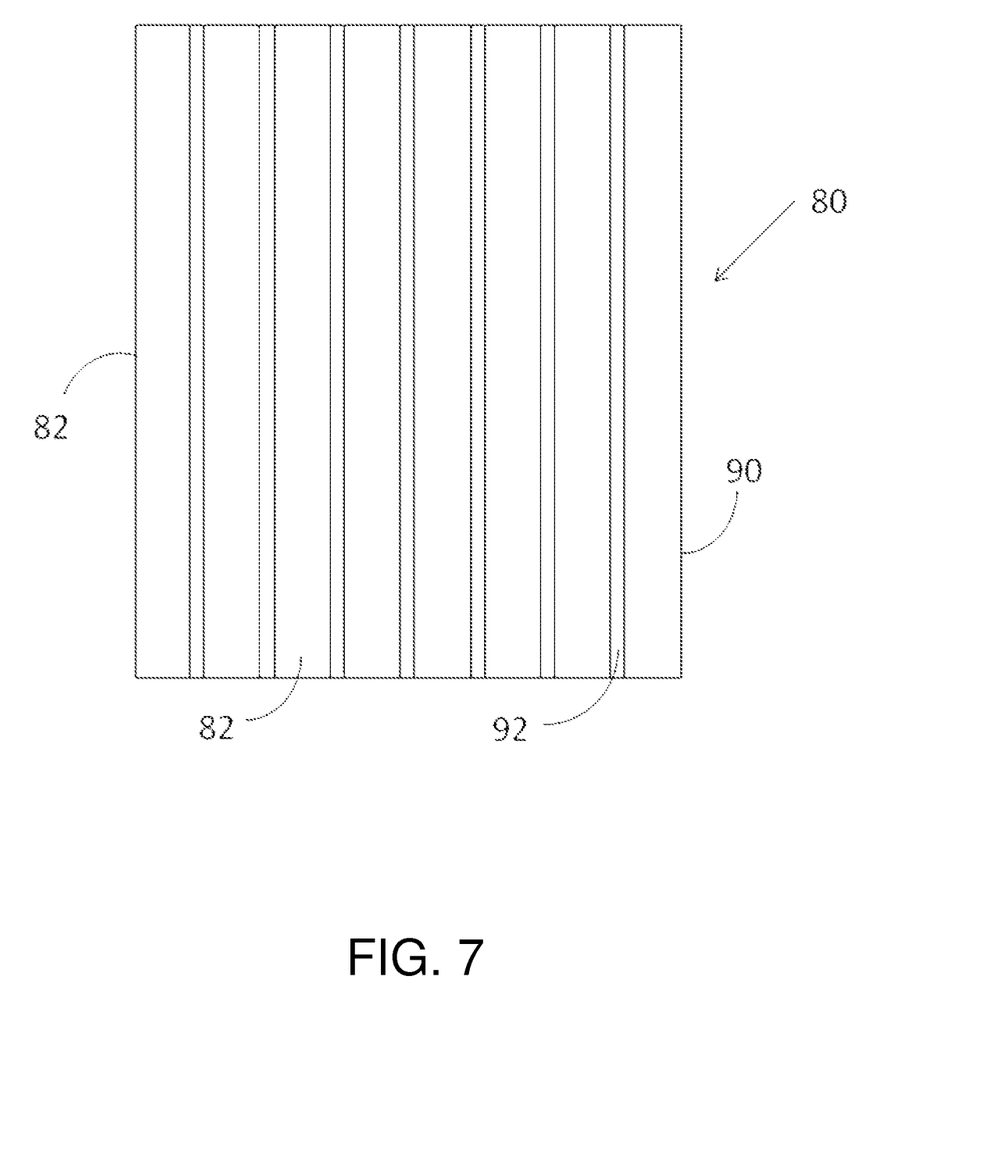

FIGS. 6 and 7 show a porous separator 80 formed from the disclosed microporous silica-filled polyethylene web that includes cured rubber powder particles characterized by low porosity. With reference to FIGS. 6 and 7, battery separator 80 is comprised of backweb 82 having an upper planar surface 84, a lower planar surface 86, and respective first and second longitudinal edges 88 and 90 that are parallel to each other. The width of the disclosed separator can be any width desired by battery manufacturers. Typical separator widths are between 117 mm and about 178 mm. The thickness, T1, of backweb 82 is typically between 0.15 mm and about 0.38 mm.

Multiple ribs 92 project from upper planar surface 84 of separator 80. Ribs 92 are disposed in the longitudinal direction of separator 80, are positioned substantially parallel to longitudinal edges 88 and 90, and may have any cross-sectional configuration used in the art. Ribs 92 are typically parallel to one another and to edges 88 and 90, but may be inclined at an angle to edges 88 and 90 (i.e., be diagonally disposed), or may be sinusoidal rather than straight. Ribs 92 project above upper planar surface 84 of backweb 82 and thereby define an overall separator thickness, T2, of between about 0.5 mm and about 2.0 mm. The number of ribs provided on a separator sheet varies according to the battery specifications, ranging between 19 and 43 ribs. A preferred embodiment includes 19 to 25 ribs 92 for each separator sheet 80. The distance, S, between adjacent ribs 92 is typically between about 3.0 mm and about 6.7 mm.

Figure 8:
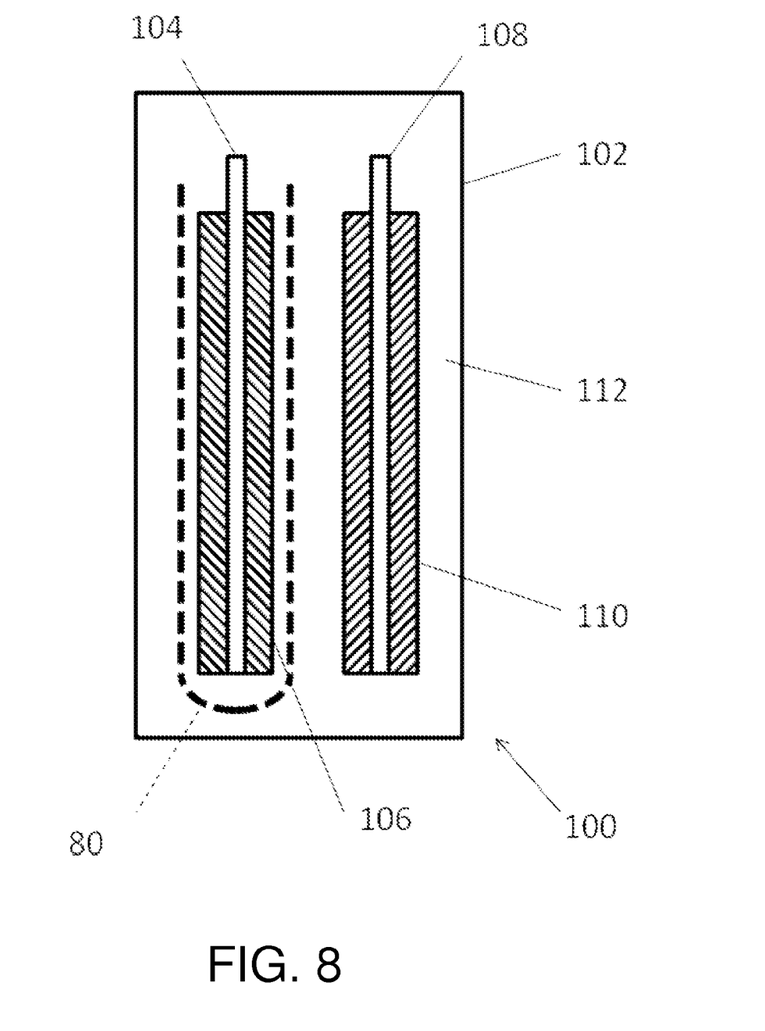
FIG. 8 is a cross-sectional view of a lead-acid storage battery in which the disclosed microporous separator is installed.

FIG. 8 shows a lead-acid storage battery cell 100 in which porous separator 80 is installed. With reference to FIG. 8, storage battery cell 100 includes a closed cell case 102 in which a positive electrode grid 104 coated with positive active material 106 and a negative electrode grid 108 coated with a negative active material 110 are positioned in spaced apart relationship. Porous separator 80 envelops positive electrode grid 104 to electrically isolate it from negative electrode grid 108. Positive and negative electrode grids 104 and 108 are immersed in a sulfuric acid electrolyte 112 that fills the interior of cell case 102. The uncoated ends of positive and negative electrode grids 104 and 108 function as connection tabs to which battery terminals can be connected.

It will be obvious to those having skill in the art that many changes may be made to the details of the above-described embodiments without departing from the underlying principles thereof. The scope of the present invention should, therefore, be determined only by the following claims.

The invention claimed is:

1. A microporous silica-filled polyethylene separator including cured rubber powder particles characterized by a low particle porosity of less than 40% porosity within individual ones of the cured rubber powder particles, the cured rubber powder particles containing an active ingredient and, facilitated by the low particle porosity, exhibiting through a controlled release mechanism a low rate of diffusion of the active ingredient out of the particles and thereby out of the microporous silica-filled polyethylene separator.

2. A microporous silica-filled polyethylene separator including cured rubber powder particles characterized by a low particle porosity not exceeding 10% porosity within individual ones of the cured rubber powder particles, the cured rubber powder particles containing an active ingredient and, facilitated by the low particle porosity, exhibiting through a controlled release mechanism a low rate of diffusion of the active ingredient out of the particles and thereby out of the microporous silica-filled polyethylene separator.

3. The separator of claim 1, in which the cured rubber powder particles contain carbon black colorant.

4. The separator of claim 1, in which the cured rubber powder particles contain silica.

5. The separator of claim 1, in which the microporous silica-filled polyethylene separator contains a mass ratio of cured rubber powder particles to polyethylene of between about 0.01 and about 1.0.

6. The separator of claim 5, in which the mass ratio of cured rubber powder particles to polyethylene is between about 0.1 and about 0.25.

7. The separator of claim 1, in which the cured rubber powder particles have an antimony selectivity factor of greater than about 1.10, as determined by the Antimony Suppression Test.

8. The separator of claim 1 characterized by an increase in overpotential for hydrogen evolution, according to the electrochemical compatibility (ECC) test.

9. In a lead-acid storage battery characterized by a cycle life and including positive and negative electrodes arranged in a package filled with an acid electrolyte, the improvement comprising:
 a microporous silica-filled polyethylene separator positioned between positive and negative electrodes and including cured rubber powder particles characterized by a low particle porosity of less than 40% porosity within individual ones the cured rubber powder particles, the cured rubber powder particles containing an active ingredient and, facilitated by the low particle porosity, exhibiting a low rate of diffusion of the active ingredient out of the particles and into the acid electrolyte and thereby contributing to prolonging the cycle life of the lead-acid battery.

10. In a lead-acid storage battery characterized by a cycle life and including positive and negative electrodes arranged in a package filled with an acid electrolyte, the improvement comprising:
 a microporous silica-filled polyethylene separator positioned between positive and negative electrodes and including cured rubber powder particles characterized by a low particle porosity not exceeding 10% porosity within individual ones of the cured rubber powder particles, the cured rubber powder particles containing an active ingredient and, facilitated by the low particle porosity, exhibiting a low rate of diffusion of the active ingredient out of the particles and into the acid electrolyte and thereby contributing to prolonging the cycle life of the lead-acid battery.

11. The storage battery of claim 9, in which the cured rubber powder particles contain carbon black colorant.

12. The storage battery of claim 9, in which the microporous silica-filled polyethylene separator contains a mass ratio of cured rubber powder particles to polyethylene of between about 0.01 and about 1.0.

13. The storage battery of claim 12, in which the mass ratio of cured rubber powder particles to polyethylene is between about 0.1 and about 0.25.

14. The storage battery of claim 9, in which the polyethylene separator includes UHMWPE.

15. The storage battery of claim 9, in which the microporous silica-filled polyethylene separator has a surface from which multiple spaced-apart ribs project and in which an active material is coated on the positive electrode, and further comprising attached to the ribs a nonwoven web that contributes to holding in place the active material coated on the positive electrode.

16. The storage battery of claim 15, in which the nonwoven web includes glass mat material.

17. The separator of claim 1, in which the polyethylene separator includes UHMWPE.

\* \* \* \* \*